(12) United States Patent
Ishizuka et al.

(10) Patent No.: US 6,185,929 B1
(45) Date of Patent: Feb. 13, 2001

(54) EXHAUST EMISSION CONTROL SYSTEM FOR INTERNAL COMBUSTION ENGINE

(75) Inventors: Yasuji Ishizuka, Kanagawa; Kimiyoshi Nishizawa, Yokohama, both of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/231,901

(22) Filed: Jan. 14, 1999

(30) Foreign Application Priority Data

Jan. 14, 1998 (JP) .................................................. 10-005567

(51) Int. Cl.[7] ...................................................... F01N 3/00
(52) U.S. Cl. ................................ 60/274; 60/277; 60/276; 60/285
(58) Field of Search ............................ 60/274, 277, 276, 60/285, 301, 302

(56) References Cited

U.S. PATENT DOCUMENTS

| | | | |
|---|---|---|---|
| 5,074,113 | * 12/1991 | Matsuoka | 60/276 |
| 5,179,924 | * 1/1993 | Manaka | 123/682 |
| 5,722,236 | * 3/1998 | Cullen et al. | 60/274 |
| 5,727,385 | * 3/1998 | Hepburn | 60/297 |
| 5,746,049 | * 5/1998 | Cullen et al. | 60/274 |
| 5,758,491 | * 6/1998 | Agustin et al. | 60/274 |

FOREIGN PATENT DOCUMENTS 6-66185   3/1994 (JP) .

10-274081   10/1998 (JP) .

\* cited by examiner

Primary Examiner—Thomas Denion
Assistant Examiner—Thai-Ba Trieu
(74) Attorney, Agent, or Firm—Foley & Lardner

(57) ABSTRACT

An exhaust emission control system for an internal combustion engine amounted on an automotive vehicle. The exhaust emission control system comprises a first catalyst disposed in an exhaust gas passage of the engine. The first catalyst functions to store NOx in an atmosphere having an air-fuel ratio leaner than a stoichiometric level and to release NOx in an atmosphere having an air-fuel ratio ocher than the stoichiometric level and reduce released NOx in presence of HC and CO. A second catalyst is disposed in the exhaust gas passage upstream of the first catalyst and having an oxygen absorbing ability. A control unit is provided including a first section for accomplishing an enrichment treatment by enriching stepwise an air-fuel ratio of an air-fuel mixture to be supplied to the engine to an enrichment degree at a timing at which a lean operation is changed to a stoichiometric operation in the engine, and recovering the enriched air-fuel ratio to the stoichiometric level at a recovery rate immediately after the enriching the air-fuel ratio. A second section of the control unit is for estimating the oxygen absorbing ability of the second catalyst. A third section of the control unit is for correcting the enrichment degree to decrease in the stepwise enriching as the estimated oxygen absorbing ability decreases.

17 Claims, 14 Drawing Sheets

EXHAUST EMISSION CONTROL SYSTEM FOR INTERNAL COMBUSTION ENGINE

BACKGROUND OF THE INVENTION

This invention relates to improvements in an exhaust emission control system for an internal combustion engine, particularly for an automotive internal combustion engine which is operated mainly on air-fuel mixtures having air-fuel ratios leaner than a stoichiometric level.

Hitherto, an exhaust emission control system including a NOx (nitrogen oxides) absorbing agent has been proposed to be installed to an internal combustion engine. The NOx absorbing agent is disposed in an exhaust gas passage of the engine. The NOx absorbing agent absorbs NOx when the air-fuel ratio of exhaust gas is leaner than a stoichiometric level, and releases the absorbed NOx when the air-fuel ratio becomes richer than the stoichiometric level. When judgment is made such that the amount of NOx absorbed in the NOx absorbing agent has reached a limit level, the air-fuel ratio can be controlled at a level richer than the stoichiometric level, thus accomplishing an enrichment treatment for the air-fuel ratio of exhaust gas to be introduced into the NOx absorbing agent. This causes the NOx absorbing agent to release the absorbed NOx. Such an exhaust emission control system is disclosed in Japanese Patent Provisional Publication No. 6-66185.

BRIEF SUMMARY OF THE INVENTION

Now, there has been a proposition that the NOx absorbing agent is provided with the function of a three-way catalyst. This is referred hereinafter as a "NOx storage type three-way catalyst" which is arranged not only to release NOx in a rich operation but also purify or reduce the thus released NOx with HC (hydrocarbons) and CO (carbon monoxide) which serve as a reducing agent and much emitted from the engine in the rich operation. In the rich operation, the engine is operated on an air-fuel mixture having an air-fuel ratio richer than the stoichiometric level.

It is to be noted that the NOx storage type three-way catalyst is apt to be subjected to a thermal deterioration and therefore is proposed to be disposed in the exhaust gas passage downstream of a three-way catalyst which is referred hereinafter to as simply the "three-way catalyst". In this case, the three-way catalyst has an ability of absorbing oxygen, and therefore a part of HC and CO to be supplied to the NOx storage type catalyst is unavoidably oxidized or consumed with oxygen absorbed in the three-way catalyst. As a result, the amount of HC and CO to be supplied to the NOx storage type catalyst becomes deficient, so that NOx cannot be effectively reduced.

In order to cope with the above, a basic value of enrichment degree relative to the stoichiometric level in the rich operation is determined corresponding to an amount of HC and CO to be required for releasing and reducing NOx absorbed or stored in the NOx storage type three-way catalyst. Additionally, the enrichment degree basic value is increased to a side where the enrichment degree increases (i.e., a correction amount is added to the enrichment basic value), upon taking account of the fact that a certain amount of HC and CO is oxidized with oxygen absorbed in the three-way catalyst.

However, since the oxygen absorbing ability and the oxidizing ability of the three-way catalyst change owing to deterioration with age and different temperature conditions, the amount of HC and CO to be supplied to the NOx storage three-way catalyst becomes excessive or deficient in case that the abovementioned correction amount determined upon taking account of the oxygen absorbing ability of the three-way catalyst is constant. For example, assume that the correction amount is matched to be optimum for the three-way catalyst in a new condition. In this case, when the three-way catalyst has been deteriorated so that its oxygen absorbing ability lowers, the amount of HC and CO to be supplied to the NOx storage type three-way catalyst becomes excessive by an amount corresponding to a decreased amount of HC and CO oxidized by the three-way catalyst.

Therefore, an object of the present invention is to provide an improved exhaust emission control system for an internal combustion engine, including a three-way catalyst (having an oxygen absorbing ability) and a NOx storage type catalyst, by which the NOx storage type catalyst can be caused to be effectively function so as to reduce NOx at a high efficiency.

Another object of the present invention is to provide an improved exhaust emission control system for an internal combustion engine, including a three-way catalyst (having an oxygen absorbing ability) and a NOx storage type three-way catalyst, by which the amount of HC and CO can be effectively supplied to the NOx storage type three-way catalyst without excess and deficiency even in case that the three-way catalyst having the oxygen absorbing ability is deteriorated with age and/or is subjected to different temperature conditions.

A further object of the present invention is to provide an improved exhaust emission control system for an internal combustion engine, including a three-way catalyst (having an oxygen absorbing ability) and a NOx storage type three-way catalyst, by which an enrichment degree in an enrichment treatment for air-fuel ratio of air-fuel mixture to be supplied to the engine is altered in accordance with a changing oxygen absorbing ability of the three-way catalyst.

An aspect of the present invention resides in an exhaust emission control system for an internal combustion engines The exhaust emission control system comprises a first catalyst disposed in an exhaust gas passage of the engine The first catalyst functions to trap NOx in an atmosphere having an air-fuel ratio leaner than a stoichiometric level and to release NOx in an atmosphere having an air-fuel ratio richer than the stoichiometric level and reduce released NOx in presence of HC and CO. A second catalyst is disposed in the exhaust gas passage upstream of the first catalyst and having an oxygen trapping ability. A control unit is provided including a first section for accomplishing an enrichment treatment by enriching stepwise an air-fuel ratio of an air-fuel mixture to be supplied to the engine to an enrichment degree at a timing at which a lean operation is changed to a stoichiometric operation in the engine, and recovering the enriched air-fuel ratio to the stoichiometric level at a recovery rate immediately after the enriching the air-fuel ratio. A second section of the control unit is for estimating the oxygen trapping ability of the second catalyst. A third section of the control unit is for correcting the enrichment degree to decrease in the stepwise enriching as the estimated oxygen trapping ability decreases.

Another aspect of the present invention resides in an exhaust emission control system for an internal combustion engine. The exhaust emission control system comprises a first catalyst disposed in an exhaust gas passage of the engine. The first catalyst functions to trap NOx in an atmosphere having an air-fuel ratio leaner than a stoichiometric level and to release NOx in an atmosphere having an air-fuel ratio richer than the stoichiometric level and reduce released NOx in presence of HC and CO. A second catalyst is disposed in the exhaust gas passage upstream of the first catalyst and having an oxygen trapping ability. A control unit is provided including a first section for accomplishing an enrichment treatment by enriching stepwise an air-fuel ratio of an air-fuel mixture to be supplied to the engine to an enrichment degree at a timing at which a lean operation is changed to a stoichiometric operation in the engine, and recovering the enriched air-fuel ratio to the stoichiometric level at a recovery rate immediately after the enriching the air-fuel ratio. A second section of the control unit is for increasing the enrichment degree in the stepwise enriching by an amount corresponding to a quantity of HC and CO oxidized with oxygen trapped in the second catalyst, the quantity of HC and CO forming part of HC and CO to be supplied to the first catalyst A third section of the control unit is for restricting the enrichment degree in the stepwise enriching within a combustion stability limit when the enrichment degree in the stepwise enriching is to exceed the combustion stability limit on a side of rich air-fuel mixture, and correcting the recovery rate in a manner that the first catalyst is able to be supplied with a quantity of HC and CO which is generally equal to a quantity of HC and CO in the same condition except for the enrichment degree being not restricted by the combustion stability limit.

DETAILED DESCRIPTION OF THE INVENTION

Figure 1:
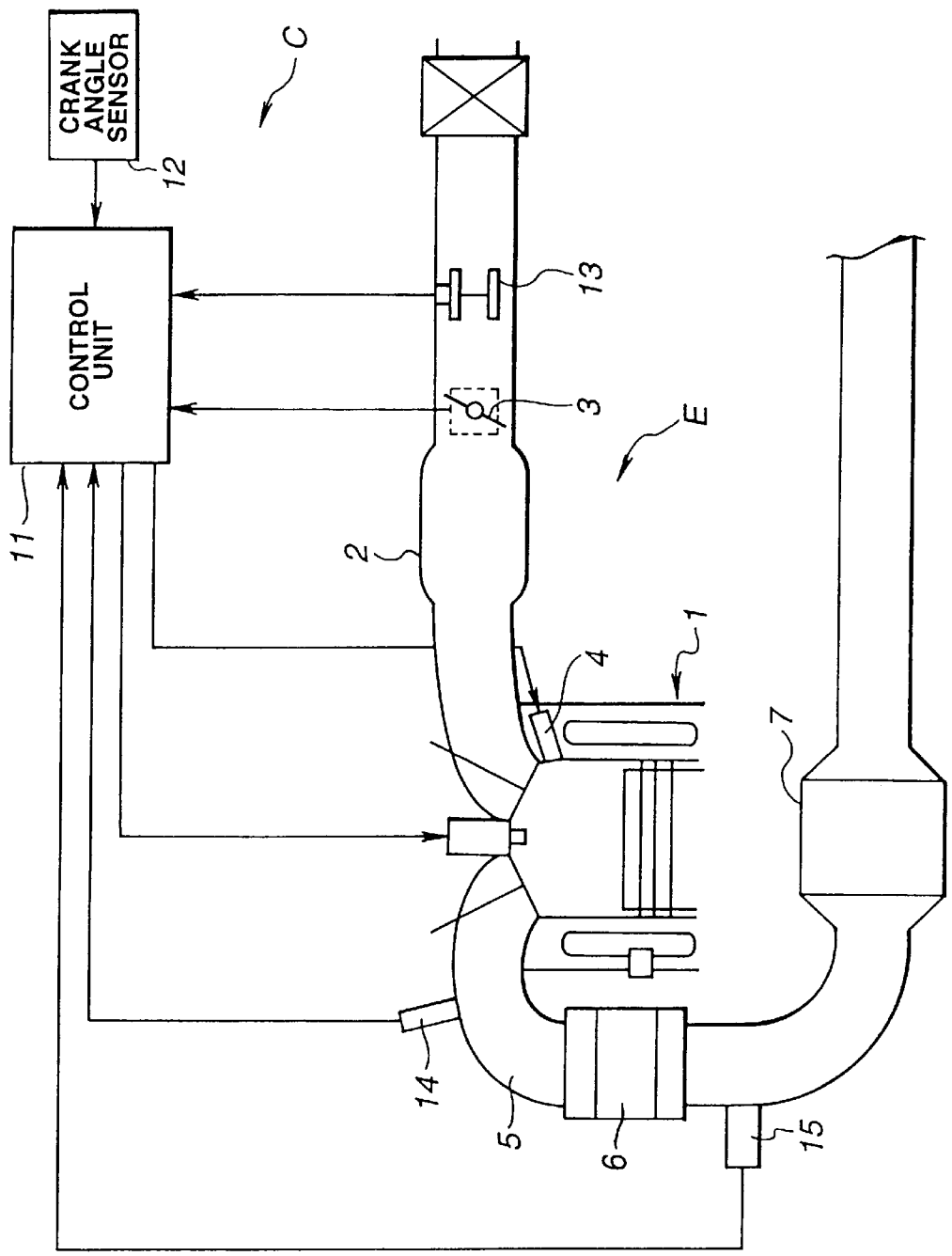
FIG. 1 is a schematic illustration of a first embodiment of an exhaust emission control system for an internal combustion engine, according to the present invention.

Referring now to FIGS. 1 to 14, more specifically to FIG. 1, a first embodiment of an exhaust emission control system C for an internal combustion engine E. The engine E of this embodiment is for an automotive vehicle and of a cylinder-direct injection multi-cylinder spark-ignition type wherein fuel is injected directly into each cylinder. The engine E includes an engine main body 1 which is provided with an intake air passage 2, and an exhaust gas passage 5. A throttle valve 3 is disposed in the intake air passage 2 to control the quantity of intake air flowing through the intake air passage 2. A fuel injector valve 4 is disposed to project in each cylinder (not identified) of the engine main body 1 so as to directly inject fuel into the cylinder. The fuel injector valve 4 is arranged to inject fuel to form an air-fuel mixture having a certain air-fuel ratio in the cylinder, in accordance with an injection signal (not shown) transmitted from a control unit 11 which forms a major part of the exhaust emission control system C.

The exhaust emission control system C includes a variety of sensors, such as a crankangle sensor 12, an airflow meter 13, oxygen ($O_2$) sensors 14, 15, an engine coolant temperature sensor (not shown), a gear position sensor (not shown), a vehicle speed sensor (not shown), and an accelerator operation amount sensor (not shown). The crankangle sensor 12 is adapted to generate a reference signal Ref at a rotational angle of a crankshaft (not shown) corresponding to a standard position of each piston, and a position signal Pos every a certain rotational angle of the crankshaft thereby to detect an engine speed NE of the engine E. The airflow meter 13 is disposed in the intake air passage 2 and adapted to generate an intake air quantity signal representative of a quantity Qa of intake air to be supplied to the engine E. The oxygen sensors 14, 15 are disposed in the exhaust gas passage 5 and adapted to generate an air-fuel ratio (oxygen concentration) signal representative of an air-fuel ratio (oxygen concentration) in the exhaust gas passage 5. The engine coolant temperature sensor is adapted to generate an engine coolant temperature signal representative of a temperature TWN of engine coolant (not shown) of the engine E. The gear position sensor is adapted to generate a gear position signal representative of the gear position of a transmission (not shown) of the engine E. The vehicle speed sensor is adapted to generate a vehicle speed signal representative of a vehicle speed VSP. The accelerator operation amount sensor is adapted to generate an accelerator operation amount signal representative of an operation amount APTV of an accelerator pedal (not shown).

Figure 2:
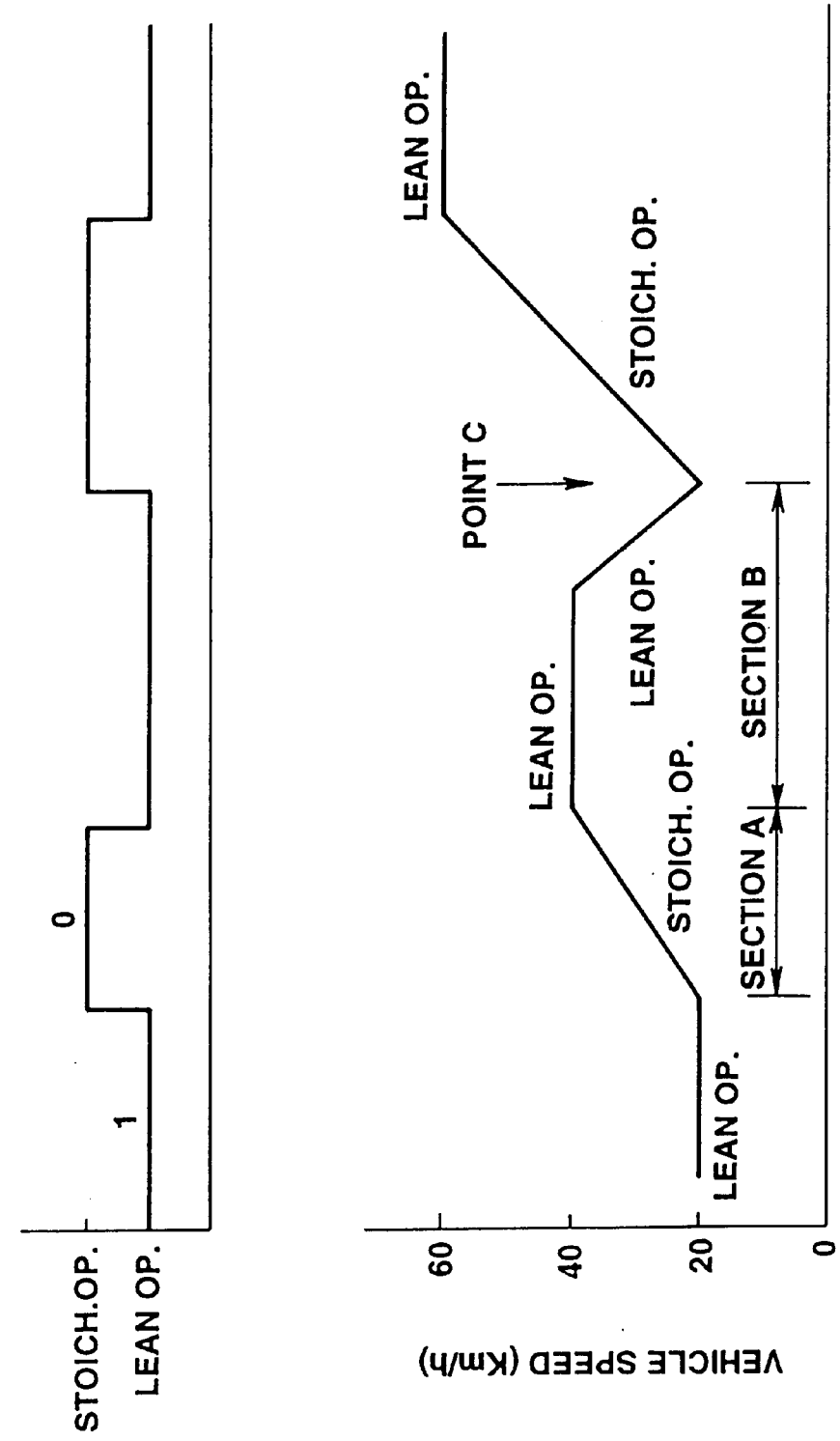
FIG. 2 is a graph showing a wave form of a lean operation permitting flag under a changing vehicle speed, used in the control system of FIG. 1.

The control unit 11 is supplied with the above-mentioned signals from the various sensors and arranged to judge an operating condition of the vehicle in accordance with the signals. Under such judgement of the vehicle operating condition, the engine E is controlled to be operated on an air-fuel mixture having a lean air-fuel ratio (accomplishing a so-called lean operation) in a certain engine operating ran-e where an engine load is not so high, and is operated on an air-fuel mixture having a generally stoichiometric air-fuel ratio (accomplishing so-called stoichiometric operation) in —other engine operating ranges. For example, assuming that the vehicle speed changes as shown in FIG. 2, a flag FLEAN (discussed after) for permitting a lean operation of the engine changes as shown, in which the lean operation is carried out upon FLEAN=1 while the stoichiometric operation is carried out upon FLEAN=0.

A three-way catalyst 6 serving as a second catalyst is disposed in the exhaust gas passage 5, in which the catalyst has an ability of absorbing oxygen and functions at the highest efficiency to reduce NOx (nitrogen oxides) and oxidize HC hydrocarbons) and CO (carbon monoxide) during the stoichiometric operation of the engine. During the lean operation of the engine, the three-way catalyst 6 oxides HC and CO but reduction efficiency for NOx is low. In view of this, a NOx storage type three-way catalyst 7 serving as a first catalyst is disposed in the exhaust gas passage 5 downstream of the three-way catalyst 6. The NOx storage type three-way catalyst 7 is arranged to function to absorb NOx in the atmosphere of exhaust gas having an air-fuel ratio leaner that the stoichiometric level and to release NOx in the atmosphere of exhaust gas having an air-fuel ratio richer than the stoichiometric level, in which released NOx can be reduced in the presence of HC and CO. Accordingly, NOx generated in the engine during the lean operation can be absorbed or stored in the NOx storage type three-way catalyst 7 It will be understood that exhaust gas having the air-fuel ratio leaner than the stoichiometric level is produced when the engine is supplied with air-fuel mixture having the air-fuel ratio leaner than the stoichiometric level, while exhaust gas having the air-fuel ratio richer than the stoichiometric level is produced when the engine is supplied with air-fuel mixture having the air-fuel ratio richer than the stoichiometric level.

Assuming that the lean operation of the engine is continued for a long time, the NOx storage type three-way catalyst 7 reaches its limit of ability of absorbing or storing NOx, and therefore it becomes impossible that the three-way catalyst 7 absorb or store NOx over the limit. In this regard, an enrichment treatment for the air-fuel ratio of the air-fuel mixture is carried out at a changeover timing from the lean operation to the stoichiometric operation. In case of FIG. 2, in order to cause the NOx storage type three-way catalyst 7 to release and reduce NOx which has been absorbed or stored in the three-way catalyst 7 in a section B in FIG. 2, the enrichment treatment is carried out at a point C immediately after the section B.

Now, since the three-way catalyst 6 has the oxygen absorbing ability. Ability a part of HC and CO to be supplied to the NOx storage type three-way catalyst 7 is unavoidably oxidized or consumed with oxygen absorbed in the three-way catalyst 6. As a result, HC and CO to be supplied to the NOx storage type three-way catalyst 7 becomes deficient by a quantity corresponding to the consumed HC and CO thereby making it impossible to accomplish efficient reduction for NOx.

In order to cope with the above, a basic value for a degree of enrichment (from the stoichiometric level) in the enrichment treatment is determined in accordance with a quantity of NOx required to be released from the NOx storage type three-way catalyst 7 to be reduced; and the basic value is increased to a side where the enrichment degree is enlarged from the stoichiometric level upon taking account of the quantity of HC and CO to be oxidized by the three-way catalyst 6. The basic value corresponds to the sum of a basic value SNORS and a basic value B-FORS (discussed after) in the first embodiment, or a basic value KRICHO (discussed after) in a third embodiment.

More specifically, the engine E is provided with an air-fuel ratio feedback control system which includes the control unit 11 and arranged to accomplish an air-fuel ratio feedback control in which the air-fuel ratio of the air-fuel mixture to be supplied to the engine is controlled at the generally stoichiometric value in order to cause the three-way catalysts to effectively function. For example, in the feedback control, the air-fuel ratio is determined in accordance with an effective fuel injection quantity which is obtained by multiplying a basic fuel injection quantity by a variety of correction coefficients including an air-fuel ratio feedback correction coefficient $\alpha$. The effective fuel injection quantity is a quantity of fuel to be actually injected from the fuel injector valve 4 The basic fuel injection quantity is, for example, determined in accordance with the intake air quantity and the engine speed of the engine E. Accordingly, it will be understood that the effective fuel injection quantity is changed by altering the air-fuel ratio feedback correction coefficient $\alpha$, thereby changing the air-fuel ratio. The air-fuel ratio feedback correction coefficient $\alpha$ is, for example, used for correcting a difference between the stoichiometric level and the basic air-fuel ratio determined in accordance with the basic fuel injection quantity.

Figure 3:
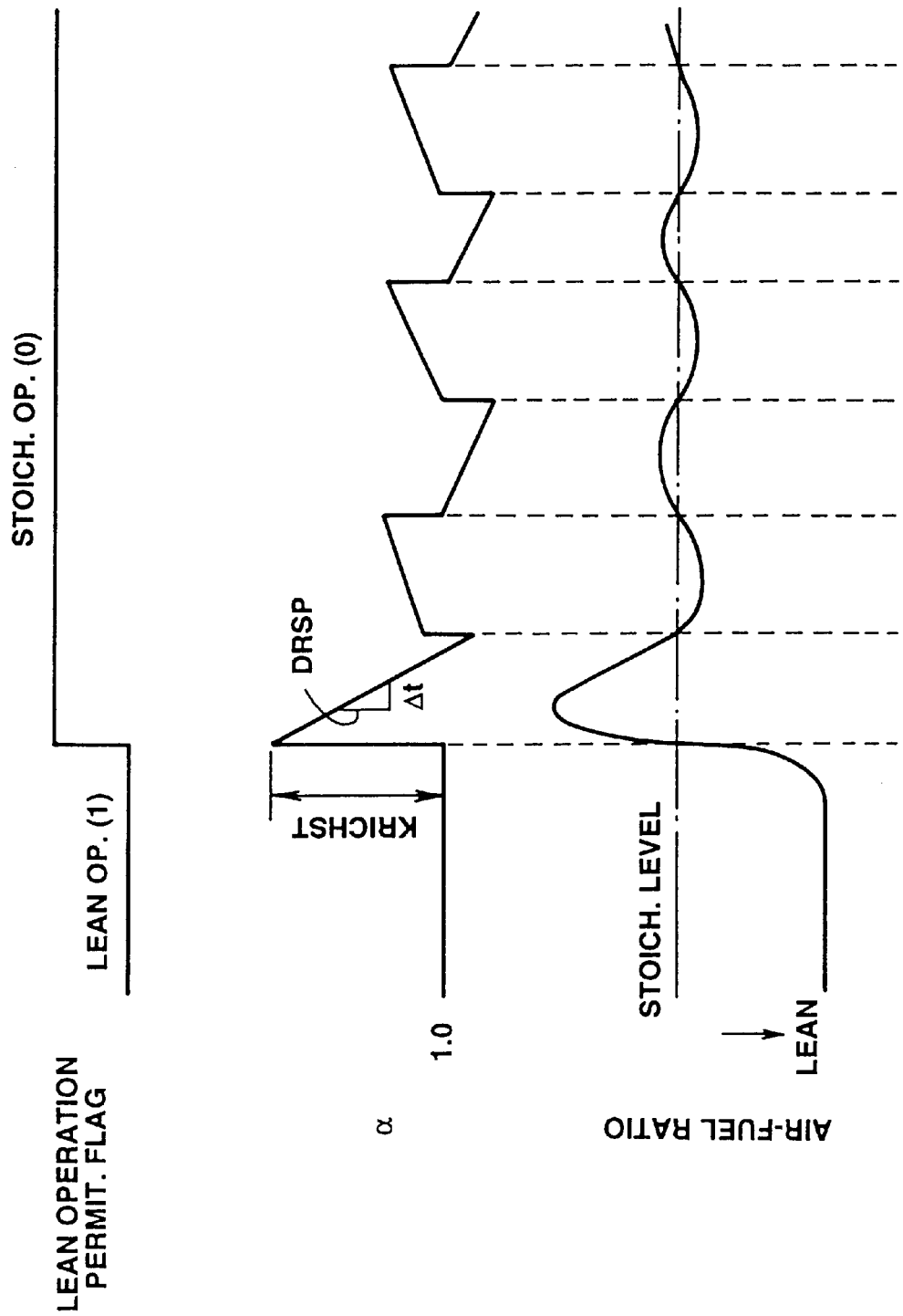
FIG. 3 is a graph illustrating an enrichment treatment for an air-fuel ratio, carried out in the control system of FIG. 1.

In this embodiment, for example, as shown in FIG. 3, the air-fuel ratio feedback correction coefficient $\alpha$ is enlarged stepwise by an amount corresponding to the enrichment degree, at the changeover timing from the lean operation to the stoichiometric operation. Then, $\alpha$ is minimized at a recovery rate DRSP ($\Delta t$). Thereafter, the enrichment treatment is terminated at a timing at which $\alpha$ reaches a slice level. Thus, the enrichment degree KRICH is enlarged by a correction amount determined upon taking account of the oxygen absorption ability of the three-way catalyst 6. The air-fuel ratio feedback correction coefficient $\alpha$ is calculated in accordance with an output of the upstream-side oxygen sensor 14 during the stoichiometric operation, and clamped at 1.0 during other operations than the stoichiometric operation.

However, the oxygen absorbing ability and oxidizing ability of the three-way catalyst 6 changes upon deterioration with age or under different temperature conditions, and therefore the quantity of HC and CO to be supplied to the NOx storage type three-way catalyst 7 becomes excessive or deficient in case that the correction amount determined upon taking account of the oxygen absorbing ability of the three-way catalyst 6 is constant.

In view of the above, according to the first embodiment, the oxygen ($O_2$) sensor 15 is disposed in the exhaust gas passage 5 downstream of the three-way catalyst 6 and upstream of the NOx storage type three-way catalyst 7. With this arrangement, the oxygen absorbing ability of the three-way catalyst 6 is estimated from an amplitude ratio (or frequency ratio) between outputs of the two oxygen sensors 14, 15 disposed respectively on the upstream and downstream sides of the three-way catalyst 6. The correction amount on the basic value for the enrichment degree is set in accordance with the thus estimated oxygen absorbing ability. This will be explained again using FIG. 2. A usual air-fuel ratio feedback control is carried out in the section A where the stoichiometric operation is made. In order to obtain the oxygen absorbing ability of the three-way catalyst 6 using this section A, an amplitude average of the output of the upstream-side oxygen sensor 14 and an amplitude average of the output of the downstream-side oxygen sensor 15 are respectively calculated, upon which a ratio between these amplitude averages is calculated. The oxygen absorbing ability is estimated from this amplitude ratio. Assuming that the amplitude ratio is large (high in oxygen absorbing ability), much oxygen is absorbed in the three-way catalyst 6 in the section B and oxidizes much reducing agents (HC and CO) produced by the enrichment treatment at the point C. Therefore, the enrichment degree at the point C is changed to increase.

A manner of the above enrichment degree control executed by the control unit 11 will be discussed with reference to flowcharts 1 to 14.

Figure 4:
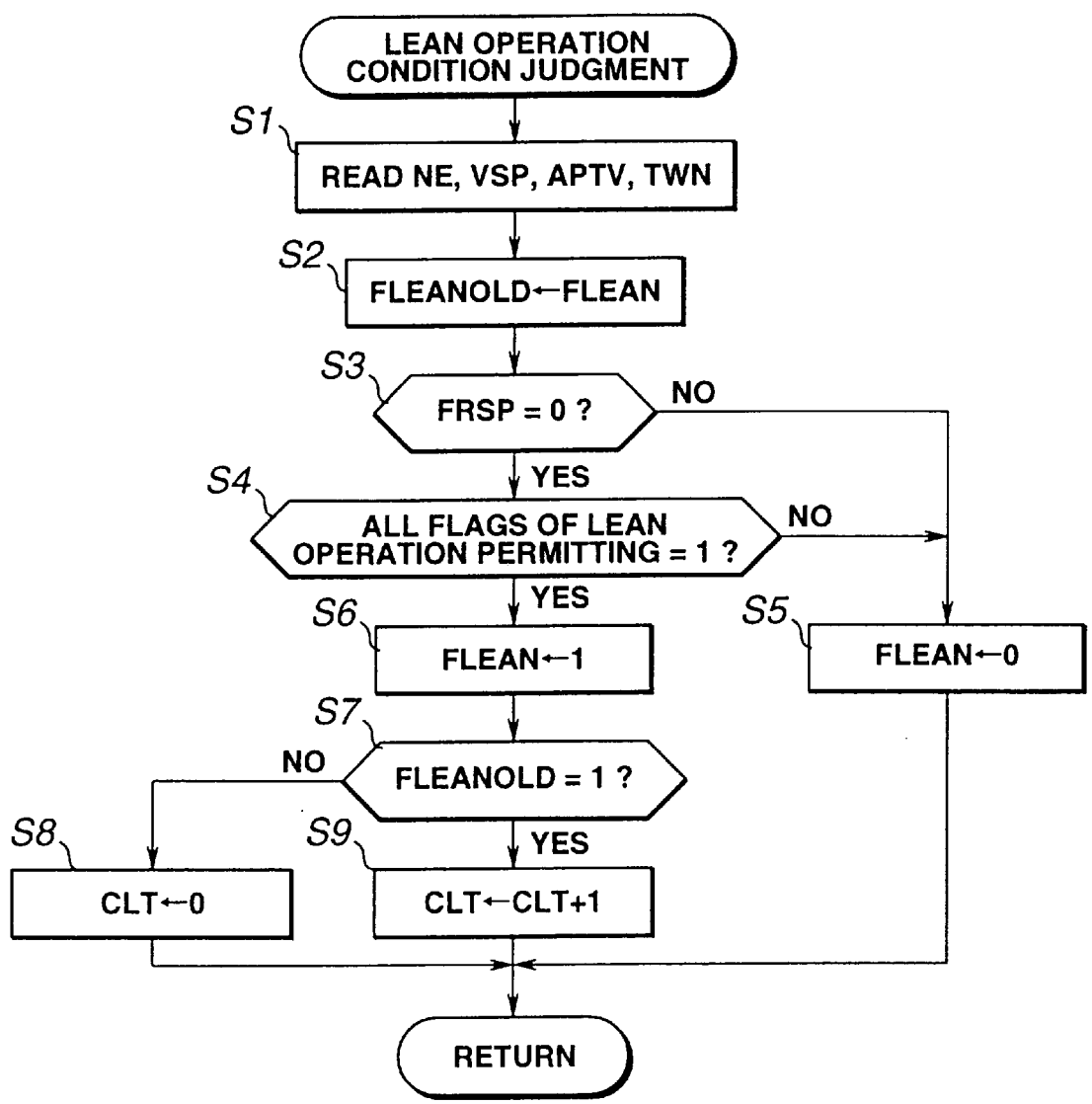
FIG. 4 is a flowchart for judging a lean operation condition, used in the control system of FIG. 1.

First, FIG. 4 shows a flowchart for accomplishing judgement of the condition of the lean operation, in which the routine of this flowchart is executed every a predetermined time (for example, 10 msec).

At a step S1, the engine speed NE, the vehicle speed VSP, the accelerator operation amount APTV, the engine coolant temperature TWN and the like are read. In accordance with these, respective ones of lean operation permitting conditions (discussed after) are successively judged.

At a step S2, the value of the lean operation permitting flag is moved to a prior time lean operation permitting flag (a flag for storing which the value of the lean operation permitting flag at a prior time or the immediately preceding computer computation cycle). Thereafter, at steps S3 and S4, checking is made on the following respective conditions:

<1> An enrichment treatment flag FRSP=0 (i.e. no enrichment treatment is being made); and
<2> All flags of the lean operation permitting conditions are 1.

If any one of the above conditions <1> and <2> s not met, a flow goes to a step S5 in which "O" (for doing not permit the lean operation) is applied to the lean operation permitting flag FLEAN. If the both two conditions <1> and <2> are met, the flow goes to a step S6 in which "1" (for permitting the lean operation) is applied.

Here, the lean operation permitting conditions of <2> include a condition where warming-up of the engine has been completed (in which a flag FLTWN=1); a condition where the engine speed is within a certain range for the lean operation (in which a flag FLRPM=1); a condition where the vehicle speed VSP is within a certain range (in which a flag FLVSP=1); a condition where the accelerator operation amount APTV is not larger than a certain value (in which a flag FLAPTV=1). The flags in <2> are the above flags FLTWN, FLRPM, FLVSP, and FLAPTV.

At a step S7, when FLEANOLD≠1 (i.e., a changeover is made for permitting the lean operation at this time or current computer computation cycle) upon judging the prior time lean operation permitting flag FLEANOLD, the flow goes to a step S8 in which "0" is applied to a counter CLT for counting a continuation time of the lean operation so as to reset the counter. On the contrary, when FLEANOLD=1 (i.e., permitting the lean operation is continued), the flow goes to a step S9 in which an increment is made on the counter CLT.

Figure 5:
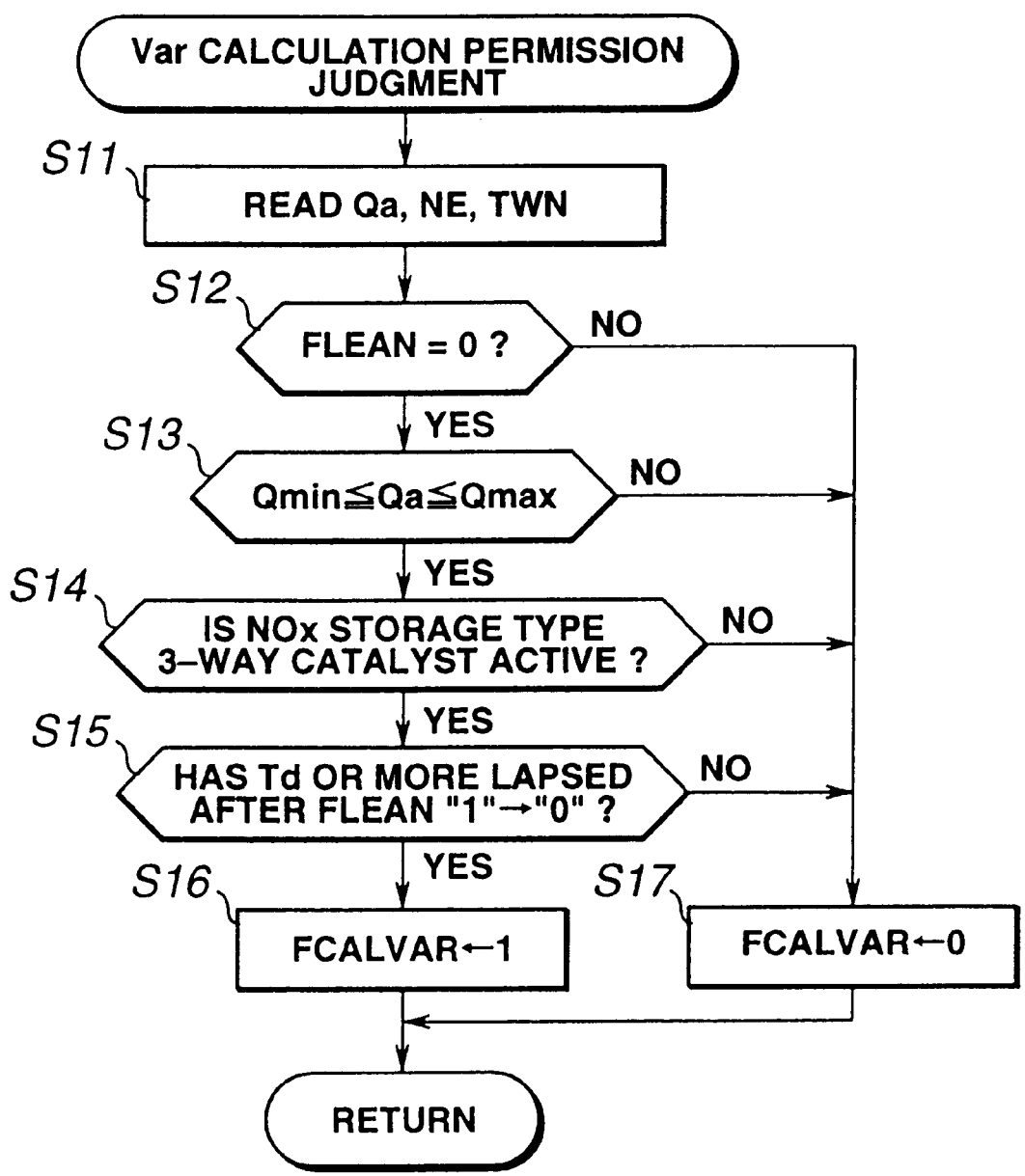
FIG. 5 is a flowchart for judging permission of calculation of an amplitude ratio Var, used in the control system of FIG. 1.

FIG. 5 shows a flowchart for accomplishing judgement for permitting calculation of the amplitude ratio Var between the outputs of the two oxygen sensors 14, 15 disposed on the upstream- and downstream-sides of the three-way catalyst 6. The routine of this flowchart is executed every 10 msec independently from the routine of FIG. 4.

At a step S11, the intake air quantity Qa, the engine speed NE, and the engine coolant temperature TWN are read. Thereafter, at steps S12 to S15, checking is made on the respective following conditions, <1> The lean operation permitting flag FLEAN=0;
<2> The intake air quantity is within a certain range (Qmin≦Qa≦Qmax);
<3> The NOx storage three-way catalyst 7 is active (i.e., the engine coolant temperature TWN is within a certain range (TWNMIN<TWN); and
<4> A predetermined delay time Td (for example, 2 to 3 seconds) has lapsed from a timing of changeover from "1" to "0" in the flag FLEAN.

When all the conditions <1> to <4> are met, calculation of the amplitude ratio is permitted (in which the amplitude ratio calculation permitting flag FCALVAR=1) at a step S16. When even any one of the conditions <1> to <4> is not met, the flow goes to a step S17 in which the calculation of the amplitude ratio is not permitted (in which the amplitude ratio calculation permitting flag FCALVAR=0).

In the above <2>, the calculation of the amplitude ratio is not permitted within ranges where the intake air quantity Qa is less than the lower limit Qmin and more than the upper limit Qmax. This is because no judgement for the oxygen absorbing ability of the three-way catalyst 6 can be made within the above ranges. Additionally, the above delay time Td is provided for the reason why the atmosphere of the stoichiometric air-fuel ratio cannot be immediately formed in the three-way catalyst 6 when a changeover is made to the stoichiometric operation under the action of the lean operation permitting flag FLEAN, so that standing-by is made until the atmosphere of the stoichiometric air-fuel ratio is formed within the three-way catalyst 6.

Figure 6:
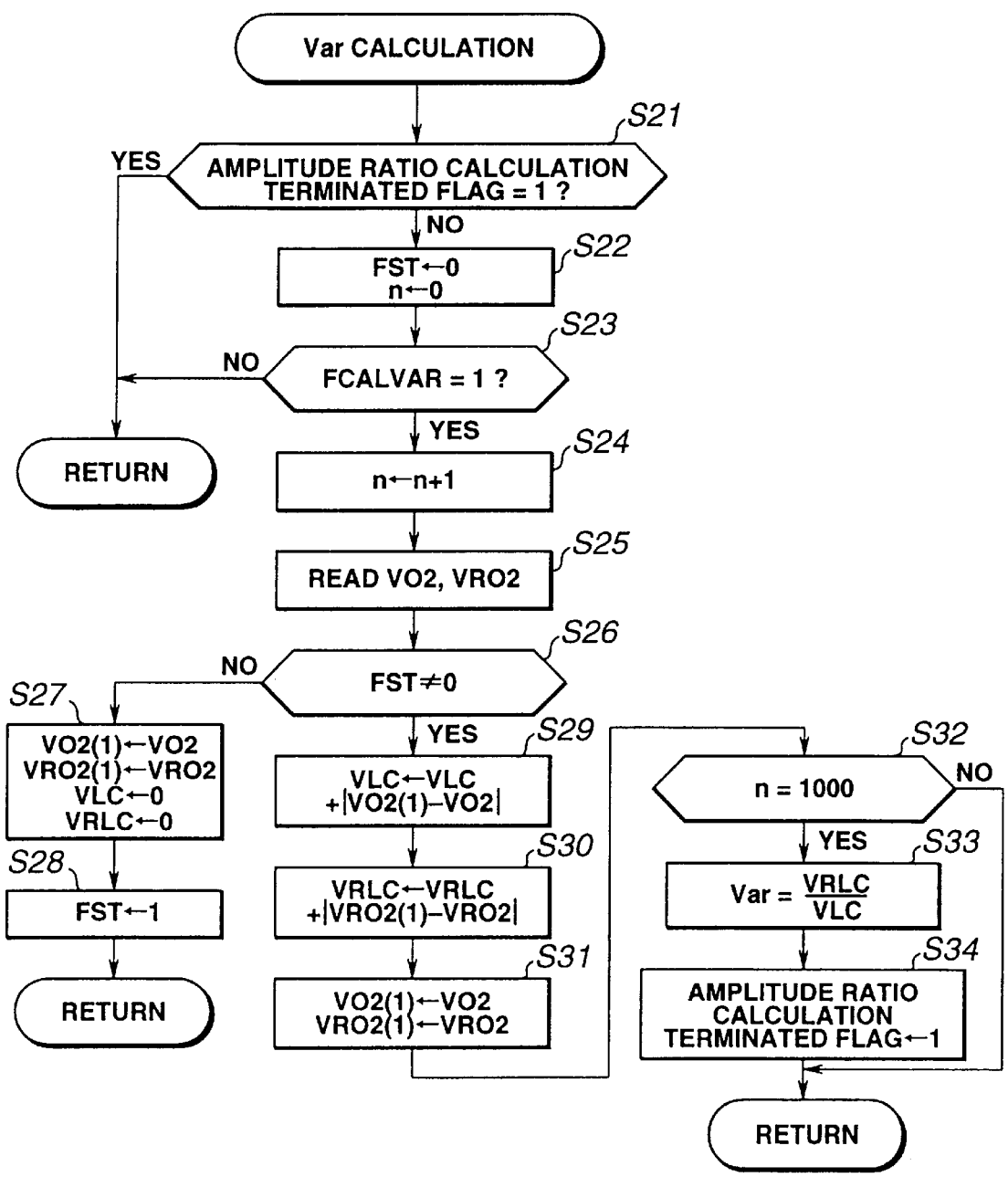
FIG. 6 is a flowchart for calculating the amplitude ratio Var.

FIG. 6 shows a flowchart for accomplishing calculation of the amplitude ratio Var. The routine of this flowchart is executed every 10 msec, following the routine in FIG. 6.

At a step S21, confirmation is made on an amplitude ratio calculation terminated flag (which is set at "0" at engine starting), When the amplitude ratio calculation terminated flag=0, the flow goes to a step S22 in which initialization is accomplished by making such initial settings that an initial value setting flag FST=0 and an integrating counter n representative of time length=0. Then, at a step S23, confirmation is made on an amplitude ratio calculation permitting flag FCALVAR. When the amplitude ratio calculation permitting flag FCALVAR=1, increment is made on the counter n at a step S24, while the output VO2 of the upstream-side oxygen sensor and the output VRO2 of the downstream-side oxygen sensor are read at a step S25.

At a step S26, confirmation is made on the initial value setting flag FST. When the initial value setting flag FST=0, the flow goes to a step S27 for the purpose of setting initial values. At the step S27, the output VO2 of the upstream-side oxygen sensor is applied to VO2(1); the output VRO2 of the downstream-side oxygen sensor is applied to VRO2(1); 0 is applied to an integrated value VLC of a change amount of the output VO2 of the upstream-side oxygen sensor per an operation time (10 msec); and 0 is applied to an integrated value VRLC of a change amount of the output VRO2 of the downstream-side oxygen sensor per the operation time. By this, setting the initial values is completed, so that the initial value setting flag FST=1 is established.

Under the action of this FST=1, the flow goes from the step S26 to a step S29 after the next time or next computer computation cycle, as far as the conditions are not changed over those at the prior time.

At the step S29, an absolute value |VO2(1)−VO2| of the change amount of the output VO2 relative to that at the prior time in the upstream-side oxygen sensor. The absolute value is added to VLC to obtain an added value which is newly set VLC. The above change amount of the output VO2 is a change amount per the operation time (10 msec). The above operation at the step S29 is continued until the counter value of the integrating counter is reaches 1000 (i.e., 10 msec× 1000=10 seconds has lapsed) as discussed after.

Figure 7A:
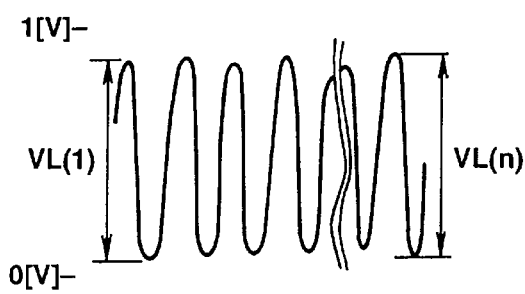
FIG. 7A is a graph showing a wave form of an output of a front-side oxygen sensor, used in the control system of FIG. 1.

Here, the wave form of the output of the upstream-side oxygen sensor in the section A in FIG. 2 is shown in FIG. 7A, in which continuing the operation at the step S29 corresponds to determining the length of a string upon a linearly represented output wave form is supposed as the string. Accordingly, VLC corresponding to the length of the string represents an amplitude integrated value. In this regard, strictly speaking, calculation is to be made for the indicated amplitudes or waves VL(1), VL(2), . . . , VL(n); however, it is sufficient to use VLC obtained at the step S29 as the amplitude integrated value, from the viewpoint of calculation accuracy.

Figure 7B:
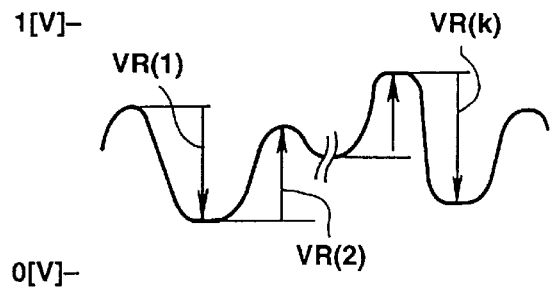
FIG. 7B is a graph showing a wave form of an output of a rear-side oxygen sensor, used in the control system of FIG. 1.

Turning back to the flowchart of FIG. 6, at a step S30, an operation similar to that at the step S29 is made so that an absolute value |VRO2(1)−VRO2| of the change amount of the output VRO2 relative to that at the prior time in the downstream-side oxygen sensor is added to VRLC to obtain an added value which is newly set VRLC. At a step S31, the values of VO2 and VRO2 are removed respectively to the corresponding VO2(1) and VRO2(1) for the purpose of calculation at the next time or next computer computation cycle. The wave form of the output of the downstream-side oxygen sensor in the section A in FIG. 2 is shown in FIG. 7B and similar to that of the upstream-side oxygen sensor as shown in FIG. 7A. Accordingly, strictly speaking, calculation is to be made for the indicated amplitudes or waves VR(1), VR(2), . . . , VR(k); however, it is sufficient to use VRLC obtained at the step S30 as the amplitude integrated value, from the viewpoint of calculation accuracy.

At a step S32, the counter value of the integrating counter n is compared with 1000. Until the counter value of the integrating counter n has reached 1000, operations at the steps S29, S30 and S31 are repeated. When the counter value of the integrating counter n has reached 1000 (n=1000), the flow goes to a step S33 in which calculation of dividing VRLC by VLC is made to obtain the amplitude ratio Var. This amplitude ratio Var represents the oxygen absorbing ability of the second catalyst 6. The amplitude ratio Var is updated to the newest value for the enrichment treatment discussed after whenever the Var calculation is permitted, so that this newest value Var represents the oxygen absorbing ability in a condition immediately before the enrichment treatment is made.

It will be understood that the amplitude ratio Var may obtained by averaging a plurality of the values of Var (Var(1) to Var(n)) which are input in a memory. This averaged Var also represents the oxygen absorbing ability of the second catalyst 6 in the condition immediately before the enrichment treatment is made Thus, calculation of Var has been completed, and therefore the setting of the amplitude ratio calculation terminated flag=1 is made.

Figure 8:
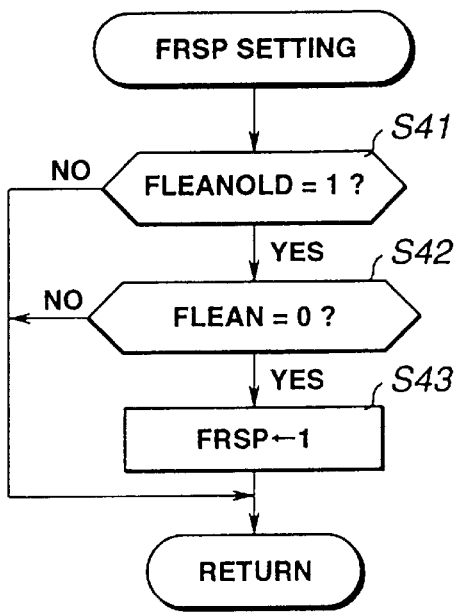
FIG. 8 is a flowchart for setting an enrichment treatment flag FRSP, used in the control system of FIG. 1.

FIG. 8 shows a flowchart for setting the enrichment treatment flag FRSP. The routine of this flowchart is executed separately from those of the flowcharts in FIGS. 4 and 5, every 100 msec. At steps S41 and S42, confirmation is made on the two flags FLEANOLD, FLEAN. Only when FLEANOLD=1 and FLEAN=0 (i.e., reaching the changeover timing from the lean operation to the stoichiometric operation), the flow goes to a step S43 in which the setting of the enrichment treatment flag FRSP (the initial setting is made at "0" at the engine starting)=1 is made.

Figure 9:
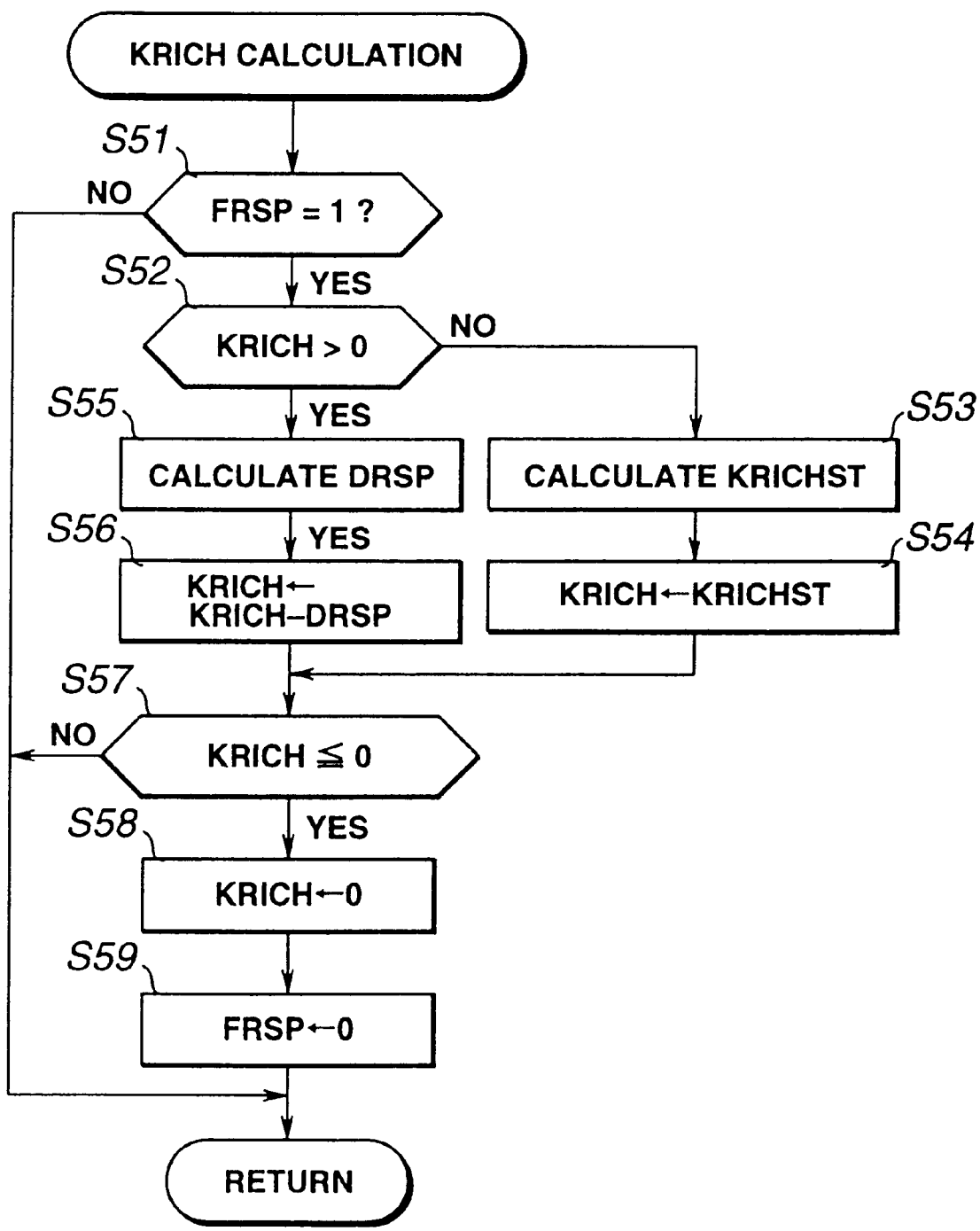
FIG. 9 is a flowchart for calculating an enrichment degree KRICH, used in the control system of FIG. 1.
Figure 10:
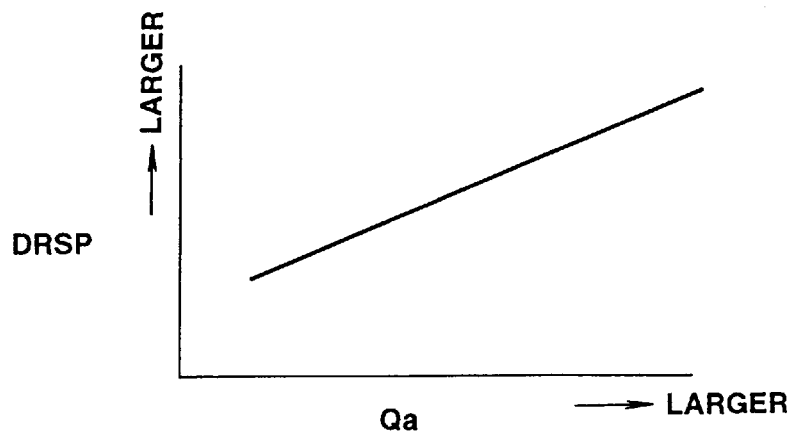
FIG. 10 is a graph showing the characteristics of a recovery rate, used in the control system of FIG. 1.

FIG. 9 is a flowchart for calculating the enrichment degree KRICH of the air-fuel ratio. The routine of this flowchart is executed following the routine of the flowchart in FIG. 8, every 10 msec.

At a step S51, confirmation is made on the enrichment treatment flag FRSP. When FRSP=1, the flow goes to a step S52 in which confirmation is made on the enrichment degree KRICH (which is initially set at 0 at the engine starting). At a timing at which the enrichment treatment flag FRSP=1, when KRICH=0, the flow goes to steps S53 and S54 in which an initial value KRICHST of the enrichment degree (the enrichment degree at a step change) is calculated (as discussed after). This initial value When KRICH>0, the flow goes from the step S52 to steps S55 and S56 in which searching is made on a table show in FIG. 10 in accordance with the intake air quantity Qa, thereby obtaining a recovery rate DRSP (a recovery amount to the stoichiometric side per the operation time (10 msec). A value obtained by subtracting this value DRSP from KRICH is newly set as KRICH. Here, the recovery rate takes the characteristics shown in FIG. 10 because the supply amount of HC and CO increases as the air quantity (airflow quantity) Qa is larger.

At a step S57, confirmation is made on the value of KRICH. When the value of KRICH is higher than 0, operations at the steps S55 and S56 are repeated Shortly, when KRICH becomes not higher than 0, the flow goes from the step 57 to steps S58 and S59 in which the setting of the enrichment treatment flag FRSP=0 is made to complete the enrichment treatment.

By employing the thus calculated enrichment degree KRICH, the air-fuel ratio feedback correction coefficient α is stepwise enlarged by the initial value KRICHST, and thereafter the coefficient α is minimized at the recovery rate DRSP. Then, at the timing at which the output of the upstream-side oxygen sensor 14 is brought into coincidence with the slice level, the normal air-fuel ratio feedback control is initiated as shown in FIG. 3.

Here, calculation of the above-mentioned initial value KRICHST of the air-fuel ratio enrichment degree will be discussed with reference to a flowchart of FIG. 11 which is a sub-routine of the step S53 in the flowchart of FIG. 9.

Figure 12:
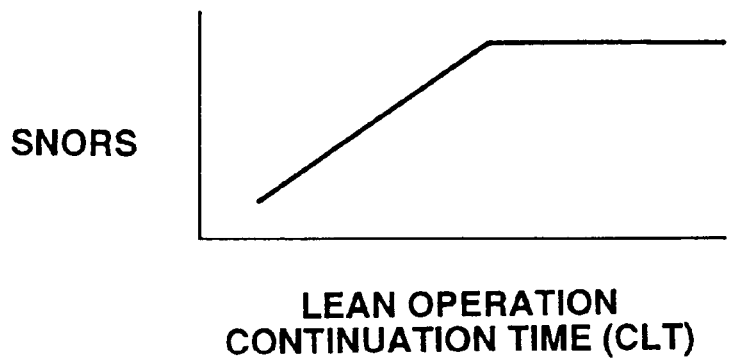
FIG. 12 is a graph showing the characteristics of a NOx release-reduction basic value SNORS, used in the control system of FIG. 1.
Figure 13:
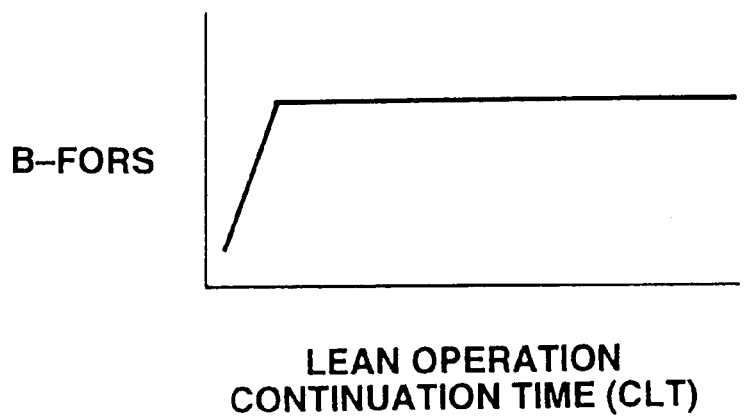
FIG. 13 is a graph showing the characteristics of an oxygen absorption basic value B-FORS, used in the control system of FIG. 1.

At steps S61 and S62, searching is made on tables shown in FIGS. 12 and 13 in accordance with the lean operation continuation time counted by the counter CLT, thereby determining the NOx release-reduction basic value SNORS for the NOx storage type three-way catalyst 7 in connection with releasing and reducing NOx and the oxygen absorption basic value B-FORS for the three-way catalyst 6 in connection with absorbing oxygen. Additionally, at a step S63, searching is made on a table shown in FIG. 14 in accordance with the newest amplitude ratio Var or the amplitude ratio in a condition immediately before the enrichment treatment is made, thereby determining a correction coefficient ADHOS for the oxygen absorption basic value B-FORS. By using the above three values SNORS, B-FORS and ADHOS, the following calculation is made at a step S64 to obtain the enrichment degree initial value KRICHST:

$$KRICHST = SNORS + B\text{-}FORS \times ADHOS$$

Here, the NOx release-reduction basic value SNORS is a value required for generating HC and CO which causing NOx absorbed in the NOx storage type three-way catalyst 7 to be released and reduced. In concrete, the value SNORS increases with the increased continuation time of the lean operation as shown in FIG. 12, and becomes constant after NOx is fully absorbed in the NOx storage type three-way catalytic converter 7. The oxygen absorption basic value B-FORS is a value corresponding to an amount of oxygen absorbed in the three-way catalyst 6 in its new condition, and has a characteristics shown in FIG. 13 which is similar to that in FIG. 12, so that it increases with the increased continuation time of the lean operation and becomes constant after oxygen is fully absorbed in the three-way catalyst 6. The characteristics in FIGS. 12 and 13 has a inclined linear portion whose inclination depends on the capacity of the catalyst, so that the inclination of the inclined linear portion is smaller as the capacity of the catalyst is larger in case of using the same engine.

Figure 14:
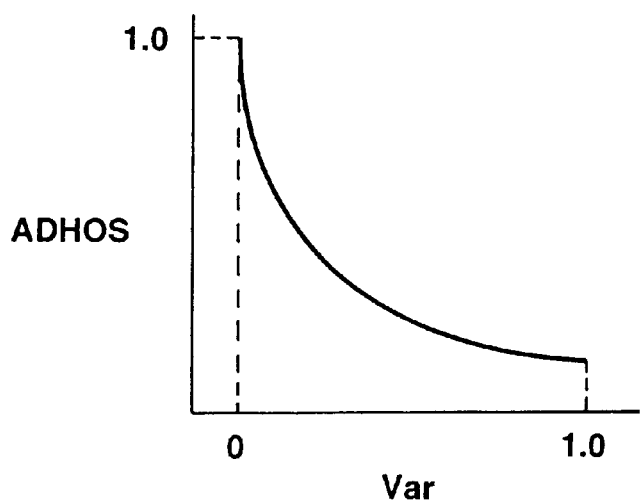
FIG. 14 is a graph showing the characteristics of a correction coefficient ADHOS, used in the control system of FIG. 1.

The correction coefficient ADIOS is a value which is minimized as the amplitude ratio Var is enlarged as shown in FIG. 14. The reason why the correction coefficient ADHOS takes such characteristics is as follows: When the three-way catalyst 6 is in its new condition where the oxygen absorbing ability is high (the amplitude ratio Var is near 0), much of HC and CO to be supplied to the NOx storage type three-way catalyst 7 is unavoidably oxidized by the three-way catalyst 6, and therefore the enrichment degree is increased by an amount corresponding to HC and CO to be oxidized in the three-way catalyst 6. The increased amount in the enrichment degree is shown as the characteristics in FIG. 13. In contrast, when the oxygen absorbing ability of the three-way catalyst 6 has been lowered (i.e., the amplitude ratio Var has approached 1) owing to deterioration with age or time lapse, the amount of HC and CO oxidized by the three-way catalyst 6 of HC and CO to be supplied to the NOx storage type three-way catalyst 7 is reduced. Accordingly, assuming that the increased amount in the enrichment degree is the same as that in case that the three-way catalyst 6 is in the new condition, the amount of HC and CO to be supplied to the NOx storage type three-way catalytic converter 7 is excessive, and therefore not only fuel is uselessly consumed but also excessive HC and CO are discharged as they are to the downstream side of the NOx storage type three-way catalytic converter 7 thereby to worsen exhaust emission.

In view of the above, according to this embodiment, the correction coefficient ADHOS is minimized as the oxygen absorbing ability of the three-way catalyst 6 lowers, thereby supplying a suitable amount of HC and CO to the NOx storage type three-way catalyst 7 without excess and deficiency even in a condition where the three-way catalyst 6 has been deteriorated.

As appreciated from the above, according to the first embodiment, the oxygen absorbing ability of the three-way catalyst 6 is estimated from the amplitude ratio (or frequency ratio) between the outputs of the two oxygen sensors 14, 15 which are respectively disposed upstream and downstream of the three-way catalyst 6 The correction coefficient ADHOS for the oxygen absorption basic value B-FORS of the three-way catalyst is set smaller as the oxygen absorbing ability becomes smaller. The initial value KRICHST of the enrichment degree is given as the sum of the oxygen absorption basic value (corrected with the correction coefficient ADHOS) of the above-mentioned three-way catalyst and the NOx release-reduction basic value SNORS of the NOx storage type (three-way) catalyst. As a result, even if deterioration with age has occurred in the three-way catalyst and/or temperature conditions for the three-way catalyst are different, supply of HC and CO to the NOx storage type (three-way) catalyst can be accomplished without excess and deficiency in quantity.

Figure 15:
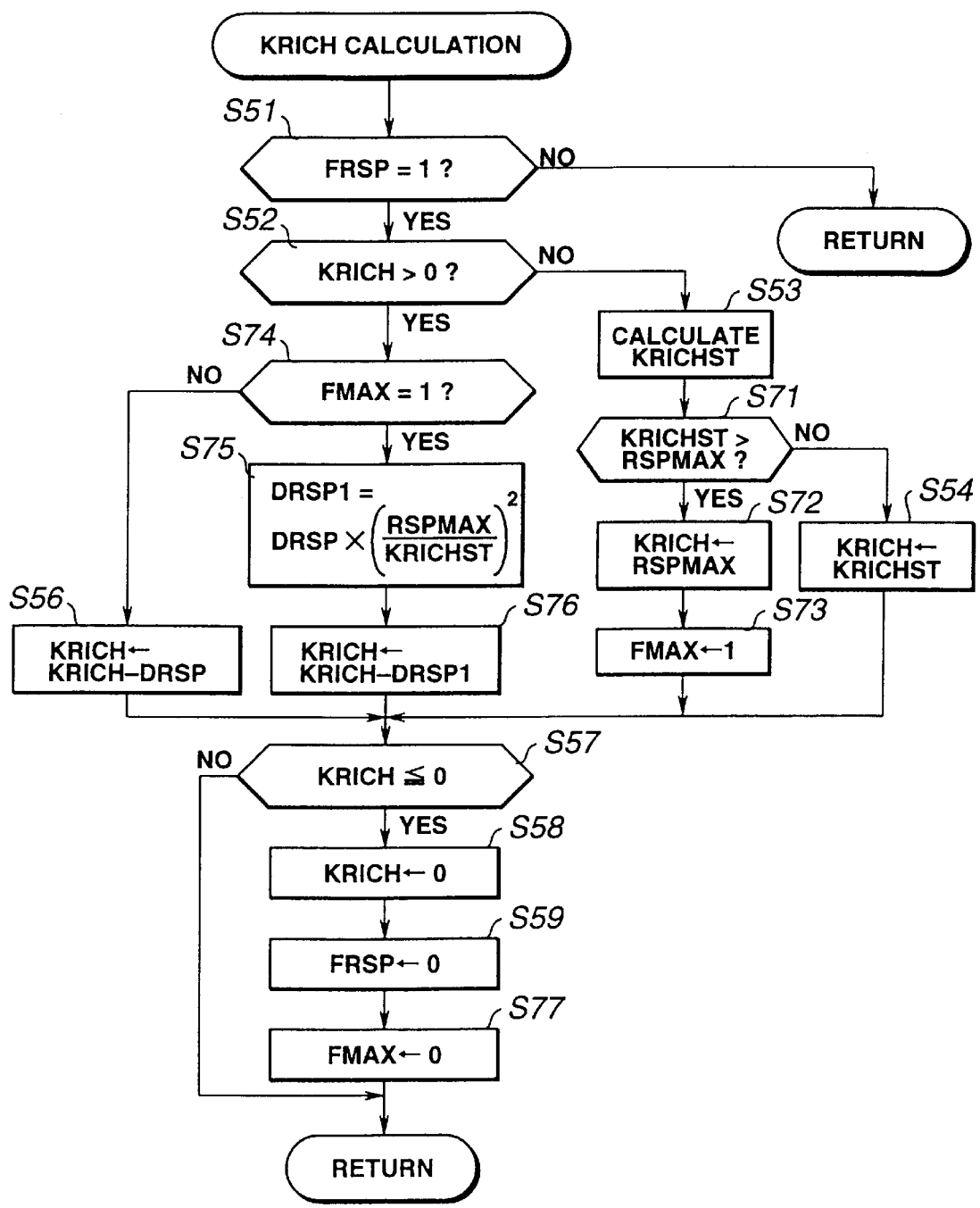
FIG. 15 is a flowchart for calculating the enrichment degree KRICH, illustrating a second embodiment of the exhaust emission control system according to the present invention.

FIG. 15 illustrates a second embodiment of the exhaust emission control system C according to the present invention, which is similar to the first embodiment shown in FIGS. 1 to 14 with the exception that the flowchart in FIG. 9 is replaced with a flowchart in FIG. 15. In the flowchart in FIG. 15, the same step numbers designate the same steps as those in FIG. 9.

The initial value KRICHST of the enrichment degree cannot be boundlessly increased so that there exists an upper limit RSPMAX (a combustion stability limit on a side of rich air-fuel ratio) of the initial value from the viewpoint of maintaining stable combustion on the rich side of the air-fuel ratio). This second embodiment is arranged to cope with an event where the enrichment degree initial value KRICHST exceeds this upper limit RSPMAX.

Figure 16:
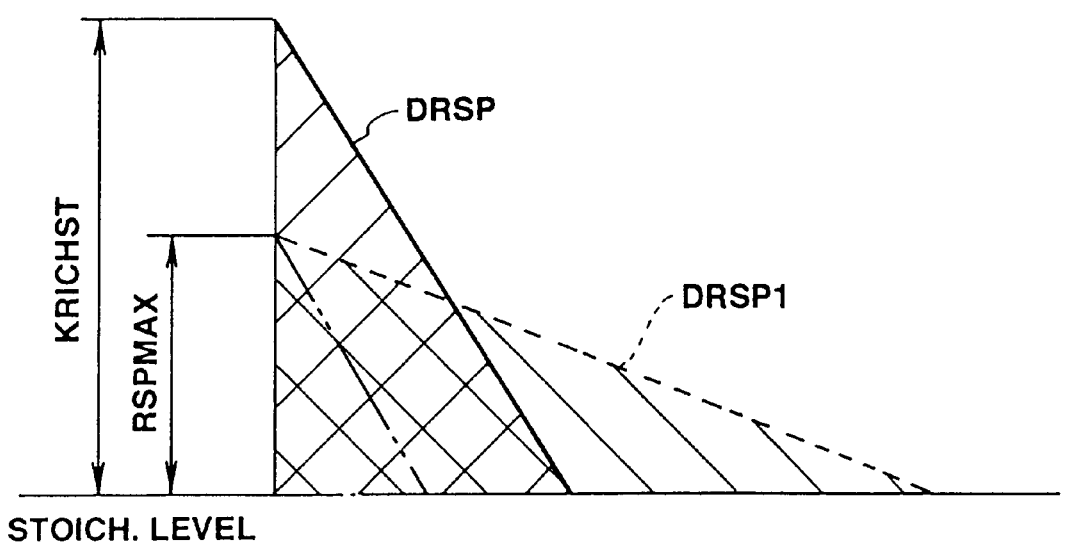
FIG. 16 is a graph illustrating a manner of calculation for a recovery rate in case that the initial value KRICHST of the enrichment degree is limited with an upper limit value RSPMAX, in connection with the control system of FIG. 15.

It will be understood that, in this embodiment, the amount of HC and CO to be supplied to the NOx storage type three-way catalytic converter 7 is to be secured similarly to that in a case where the enrichment degree initial value KRICHST is not limited with the upper limit RSPMAX. In this regard, the amount of HC and CO to be supplied to the NOx storage type three-way catalyst 7 generally corresponds to the area of a hatched high triangle having the recovery rate DRSP as shown in FIG. 16. Accordingly, even in case that the enrichment degree initial value is limited with the upper limit RSPMAX, the same amount of HC and CO can be supplied to the NOx storage type three-way catalyst 7 by lowering the recovery rate to DRSP1, as indicated as a hatched low triangle having the same area as that of the above-mentioned hatched high triangle, in FIG. 16. The recovery rate DRSP1 in case that the enrichment degree initial value is limited with the upper limit RSPMAX can be calculated by an equation (DSP1=DRSP×(RSPMAX/KRICHST)$^2$).

Specifically, at a step S53 in the flowchart in FIG. 15 at the first time of first computer computation cycle, the initial value KRICHST is calculated. Thereafter, at a step S71, this initial value KRICHST is compared with the upper limit value RSPMAX of the enrichment degree initial value. When KRICHST>RSPMAX, the flow goes to a step S72 in which the upper limit value RSPMAX is applied to KRICH. At a step S73, "1" is applied to a flag FMAX so as to represent the fact that the enrichment degree initial value is limited with the upper limit value.

At the second time or second computer computation cycle, the flow unavoidably goes from the step S52 to a step S74 in which confirmation is made on the flag FMAX. When FMAX=1, the flow goes to steps S75 and S76 in which the preset recovery rate DRSP (≈the recovery rate (a constant value) for the case that the enrichment degree initial value is not limited to the upper limit value) is multiplied by (RSPMAX/KRICHST)$^2$ thereby obtaining the recovery rate DRSP1 for the case that the enrichment degree initial value is limited with the upper limit value. Additionally, this recovery rate DRSP1 is subtracted from KRICH to obtain a value which is newly set as KRICH.

When the enrichment treatment has been completed, setting of FMAX=0 is made at a step S77.

As discussed above, according to the second embodiment, even in case that the initial value KRICHST of the enrichment degree is limited with its upper limit value RSPMAX, HC and CO to be required by the NOx storage type three-way catalyst can be supplied without excess and deficiency in quantity.

Figure 11:
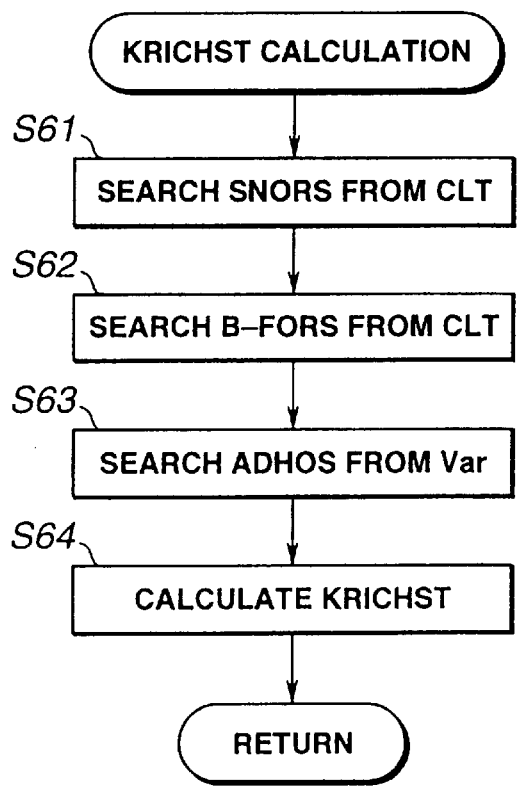
FIG. 11 is a flowchart for calculating an initial value KRICHST of the enrichment degree.
Figure 17:
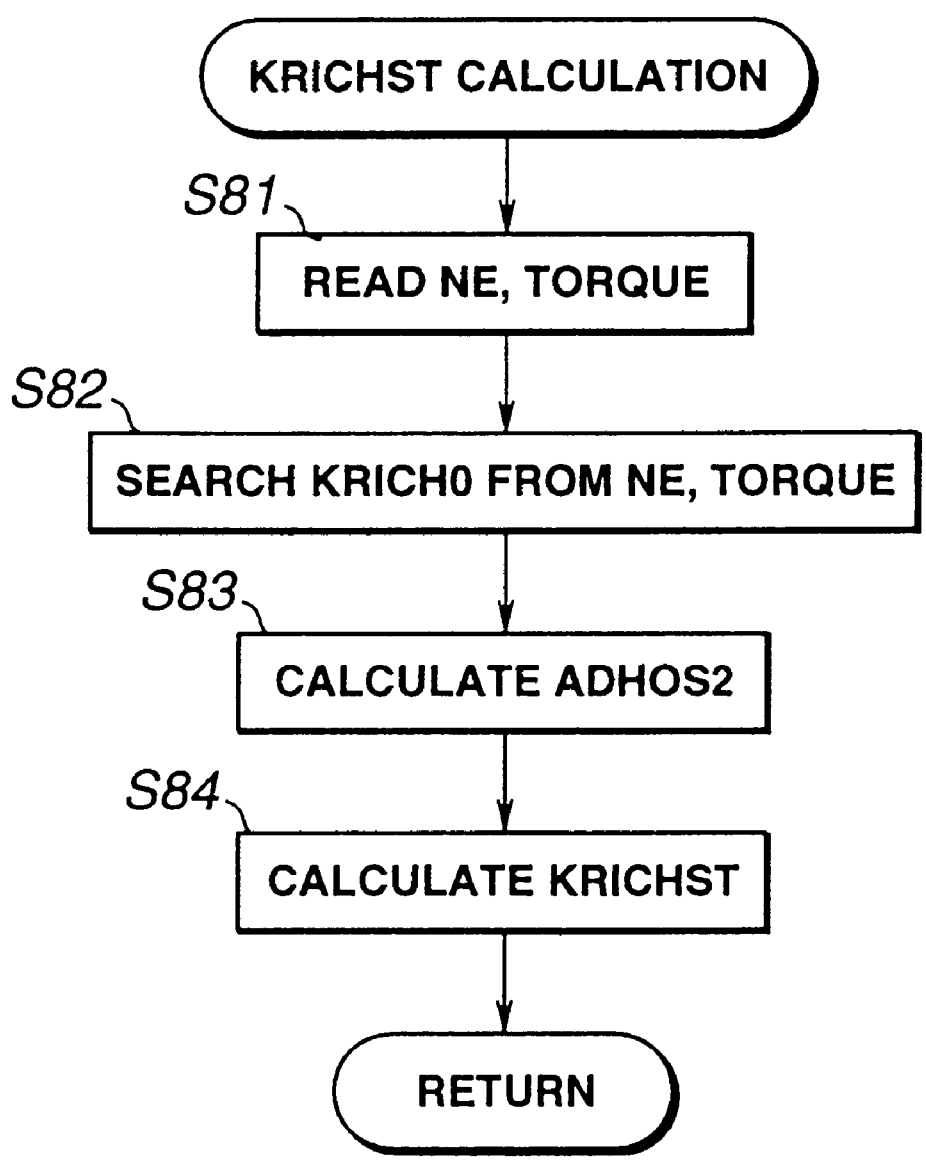
FIG. 17 is a flowchart for calculating the initial value KRICHST of the enrichment degree, illustrating a third embodiment of the exhaust emission control system according to the present invention.

FIG. 17 illustrates a third embodiment of the exhaust emission control system according to the present invention, which is similar to the first embodiment shown in FIGS. 1 to 14 with the exception that the flowchart of FIG. 11 is replaced with a flowchart of FIG. 17.

Although the first embodiment is arranged to set separately the NOx release-reduction basic value SNORS and the oxygen absorption basic value B-FORS, the second embodiment is arranged to set a value obtained by simply adding or combining SNORS and B-FORS as a basic value KRICH0 for the enrichment degree, by utilizing the fact that the amount of NOx and oxygen discharged from the engine depends on the engine speed and the engine torque of the engine.

Specifically, at a step S81, the engine speed NE and the engine torque are read. At a step S82, searching is made on a map in accordance with the engine speed and the engine torque to obtain the enrichment degree basic value KRICH0 which corresponds to the sum or combination of the NOx release-reduction basic value SNORS and the oxygen absorption basic value B-FORS. At a step S83 a correction coefficient ADHOS2 is determined by searching a table similar to that of FIG. 14 At a step S84, the enrichment degree initial value KRICHST is calculated by the following equation:

$$KRICHST=KRICH0 \times ADHOS2$$

It will be understood that the same functions as those in the first embodiment can be achieved by the third embodiment.

There has been proposed an earlier technique which is provided with a double oxygen sensor system including two oxygen sensors and arranged as follows as disclosed in Japanese Patent Application No 9-81516 (Japanese Patent Provisional Publication No. 10-274081): The two oxygen ($O^2$) sensors are disposed respectively on the upstream and downstream sides of a three-way catalyst to accomplish an air-fuel ratio feedback control for the purpose of causing the three-way catalyst to effectively function. The air-fuel ratio feedback correction coefficient $\alpha$ is used to calculate the effective or actual fuel injection quantity at which fuel is injected to be supplied to each cylinder of the engine. The air-fuel ratio feedback correction coefficient $\alpha$ is calculated in accordance with a feedback control constant (for example, a proportional amount PL, PR) which is corrected in accordance with a correction amount PHOS which is obtained in accordance with the output of the downstream-side oxygen sensor. Additionally, a wave form similar to that of the air-fuel ratio feedback correction coefficient $\alpha$ is applied to the correction amount PHOS. In this case, the feedback cycle of the correction amount PHOS is in dose relation to the oxygen absorbing ability of the three-way catalyst, and therefore the oxygen absorbing ability of the three-way catalyst can be estimated from the feedback cycle of the correction amount PHOS.

While the NOx release-reduction basic value SNORS has been shown and described as being determined by the table searching in the embodiments of the present invention, it will be understood that the basic value may be a constant value. Otherwise, the NOx release-reduction basic value SNORS may be arranged as follows: An estimated NOx storage amount NOXSUM in the NOx storage type three-way catalyst is calculated by the following equation during the lean operation of the engine:

$$NOXSUM=NOXSUMOLD+C-NOX \cdot Qa \cdot TNOX$$

where C-NOX is the concentration of NOx; TNOX is an absorption or storage rate of NOx in the NOx storage type three-way catalyst; Qa is the intake air quantity; and NOXSUMOLD is the value of NOXSUM at a prior time such as the immediately preceding computer computation cycle.

Figure 18:
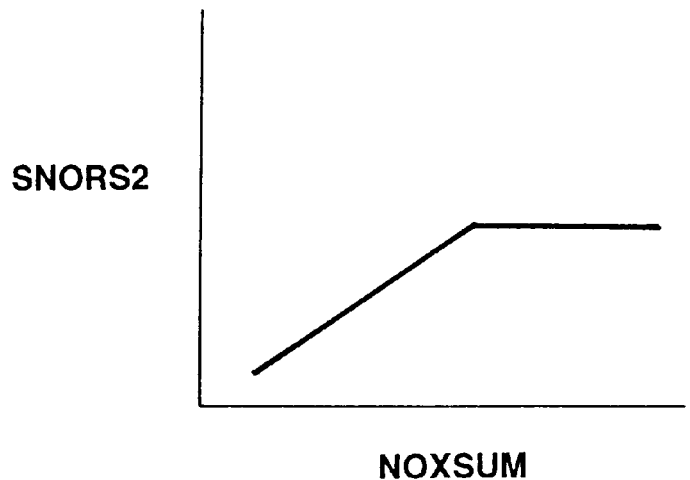
FIG. 18 is a graph showing the characteristics of the NOx release-reduction basic value SNORS2, used in the control system of FIG. 17.

The second term in the right member in above equation represents the amount of NOx to be absorbed or stored in the NOx storage type three-way catalyst per the operation time. When the changeover timing of from lean operation to the stoichiometric operation has reached, the NOx release-reduction basic value SNORS2 is determined in accordance with the estimated NOx storage amount NOXSUM by searching a table as shown in FIG. 18.

Figure 19:
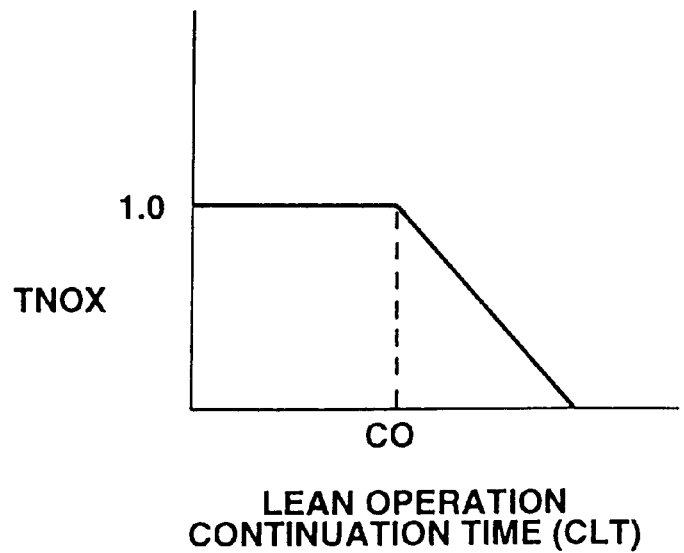
FIG. 19 is a graph showing the characteristics of a NOx absorption rate TNOX, used in the control system of FIG. 17.

The above-mentioned NOx concentration C-NOX may be determined in accordance with the engine speed NE and the engine torque (or the engine load) by searching a map (not shown). The NOx absorption rate TNOX is determined in accordance with the lean operation continuation time of the counter CLT by searching a table as shown in FIG. 19.

While discussion has been made on the cylinder-direct injection spark-ignition engine E in the embodiments, it will be appreciated that the principle of the present invention may be applied to other engines, for example, an engine provided with a lean burn system by which the engine is operated mainly on air-fuel mixture having lean air-fuel ratios.

The entire contents of Japanese Patent Application P10-5567 (filed Jan. 14, 1998) is incorporated herein by reference.

Although the invention has been described above by reference to certain embodiments of the invention, the invention is not limited to the embodiments described above. Modifications and variations of the embodiments described above will occur to those skilled in the art, in light or the above teachings. The scope of the invention is defined with reference to the following claims.

What is claimed is:

1. An exhaust emission control system for an internal combustion engine, comprising:

a first catalyst disposed in an exhaust gas passage of the engine, said first catalyst functioning to trap NOx in an atmosphere having an air-fuel ratio leaner than a stoichiometric level and to release NOx in an atmosphere having an air-fuel ratio richer than the stoichiometric level and reduce released NOx in presence of HC and CO;

a second catalyst disposed in the exhaust gas passage upstream of said first catalyst and having an oxygen trapping ability;

means for accomplishing an enrichment treatment by enriching stepwise an air-fuel ratio of an air-fuel mixture to be supplied to the engine to an enrichment degree at a timing at which a lean operation is changed to a stoichiometric operation in the engine, and recovering the enriched air-fuel ratio to the stoichiometric level at a recovery rate immediately after enriching the air-fuel ratio;

means for estimating the oxygen trapping ability of said second catalyst;

means for correcting the enrichment degree in the stepwise enriching to decrease in correlation to a decrease in the estimated oxygen trapping ability.

2. An exhaust emission control system for an internal combustion engine, comprising:

a first catalyst disposed in an exhaust gas passage of the engine, said first catalyst functioning to trap NOx in an atmosphere having an air-fuel ratio leaner than a stoichiometric level and to release NOx in an atmosphere having an air-fuel ratio richer than the stoichiometric level and reduce released NOx in presence of HC and CO;

a second catalyst disposed in the exhaust gas passage upstream of said first catalyst and having an oxygen trapping ability; and a control unit that accomplishes an enrichment treatment by enriching stepwise an air-fuel ratio of an air-fuel mixture to be supplied to the engine to an enrichment degree at a timing at which a lean operation is changed to a stoichiometric operation in the engine, and recovers the enriched air-fuel ratio to the stoichiometric level at a recovery rate immediately after enriching the air-fuel ratio, wherein the control unit estimates the oxygen trapping ability of said second catalyst, and corrects the enrichment degree in the stepwise enriching to decrease in correlation to a decrease in estimated oxygen trapping ability.

3. An exhaust emission control system as claimed in claim 2, wherein said control unit sets a NOx release-reduction basic value for said first catalyst in accordance with a lean operation continuation time, sets an oxygen trapping basic value for said second catalyst in accordance with the lean operation continuation time, and sets a sum of the NOx release-reduction basic value and said oxygen trapping basic value as the enrichment degree in the stepwise enriching, wherein said control unit corrects the enrichment degree by setting a correction coefficient which decreases as the oxygen trapping ability of said second catalyst decreases, and correcting the oxygen trapping basic value with the correction coefficient.

4. An exhaust emission control system as claimed in claim 2, wherein said control unit sets the enrichment degree in the stepwise enriching in accordance with an engine speed and an engine torque of the engine, and sets a correction coefficient which decreases as the oxygen trapping ability of said second catalyst decreases, and corrects the enrichment degree with the correction coefficient.

5. An exhaust emission control system as claimed in claim 4, wherein the enrichment degree corresponds to a sum of a NOx release-reduction basic value for said first catalyst and an oxygen trapping basic value for said second catalyst.

6. An exhaust emission control system as claimed in claim 5, wherein said NOx release-reduction basic value and said oxygen trapping basic value are set in accordance with a lean operation continuation time.

7. An exhaust emission control system as claimed in claim 2, wherein said control unit estimates the oxygen trapping ability in a condition immediately before the enrichment treatment.

8. An exhaust emission control system as claimed in claim 2, further comprising first and second oxygen sensors which are disposed in the exhaust gas passage and located respectively on an upstream side and a downstream side of said second catalyst, wherein said control unit estimates the oxygen trapping ability in accordance with a ratio between outputs of said first and second oxygen sensors.

9. An exhaust emission control system as claimed in claim 8, wherein said ratio is an amplitude ratio.

10. An exhaust emission control system as claimed in claim 8, wherein said ratio is a frequency ratio.

11. An exhaust emission control system for an internal combustion engine, comprising:

a first catalyst disposed in an exhaust gas passage of the engine, said first catalyst functioning to trap NOx in an atmosphere having an air-fuel ratio leaner than a stoichiometric level and to release NOx in an atmosphere having an air-fuel ratio richer than the stoichiometric level and reduce released NOx in presence of HC and CO;

a second catalyst disposed in the exhaust gas passage upstream of said first catalyst and having an oxygen trapping ability;

means for accomplishing an enrichment treatment by enriching stepwise an air-fuel ratio of an air-fuel mixture to be supplied to the engine to an enrichment degree at a timing at which a lean operation is changed to a stoichiometric operation in the engine, and recovering the enriched air-fuel ratio to the stoichiometric level at a recovery rate immediately after the enriching the air-fuel ratio;

means for estimating the oxygen trapping ability of said second catalyst;

means for correcting the enrichment degree in stepwise enriching to decrease in correlation to a decrease in the estimated oxygen trapping ability; and means for restricting the corrected enrichment degree to a combustion stability limit when the corrected enrichment degree exceeds the combustion stability limit on a side of a rich air-fuel mixture, and correcting the recovery rate in such a manner that amount of HC and CO to be supplied to the second catalyst when the corrected enrichment degree is restricted is generally equal to an amount of HC and CO to be supplied to the second catalyst when the corrected enrichment degree is not restricted.

12. An exhaust emission control system for an internal combustion engine, comprising:

a first catalyst disposed in an exhaust gas of the engine, said first catalyst functioning to trap NOx in an atmosphere having an air-fuel ratio leaner than a stoichiometric level and to release NOx in an atmosphere having an air-fuel ratio richer than the stoichiometric level reduce released NOx in the presence of HC and CO;

a second catalyst disposed in the exhaust gas passage upstream of said first catalyst and having an oxygen trapping ability; and a control unit that accomplishes an enrichment treatment by enriching stepwise an air-fuel ratio of an air-fuel mixture to be supplied to the engine to an enrichment degree at a timing at which a lean operation is changed to a stoichiometric operation in the engine, and recovering the enriched air-fuel ratio to the stoichiometric level at a recovery rate after enriching the air-fuel ratio, wherein the control unit estimates an oxygen trapping ability of said second catalyst and corrects the enrichment degree in stepwise enriching to decrease in correlation to a decrease in the estimated oxygen trapping ability, and wherein the control unit further restricts the corrected enrichment degree to a combustion stability limit when the corrected enrichment degree exceeds the combustion stability limit on a side of a rich air-fuel mixture, and corrects the recovery rate in a manner that an amount of HC and CO to the supplied to the second catalyst when the corrected enrichment degree is restricted is generally equal to the amount of HC and CO to be supplied to the second catalyst when the corrected enrichment degree is not restricted.

13. An exhaust emission control system as claimed in claim 12, wherein the control unit estimates the oxygen trapping ability of said second catalyst, and estimates the oxygen trapping ability in a condition immediately before the enrichment treatment.

14. An exhaust emission control system as claimed in claim 13, further comprising first and second oxygen sensors which are disposed in the exhaust gas passage and located respectively on an upstream side and a downstream side of said second catalyst, wherein said control unit estimates the oxygen trapping ability in accordance with a ratio between outputs of said first and second oxygen sensors.

15. An exhaust emission control system as claimed in claim 14, wherein said ratio is an amplitude ratio.

16. An exhaust emission control system as claimed in claim 14, wherein said ratio is a frequency ratio.

17. A method of controlling exhaust emission of an internal combustion engine provided with an exhaust emission control system including a first catalyst disposed in an exhaust gas passage of the engine, said first catalyst functioning to trap NOx in an atmosphere having an air-fuel ratio leaner than a stoichiometric level and to release NOx in an atmosphere having an air-fuel ratio richer than the stoichiometric level and reduce released NOx in presence of HC and CO, and a second catalyst disposed in the exhaust gas passage upstream of said first catalyst and having an oxygen trapping ability, the method comprising:

accomplishing an enrichment treatment by enriching stepwise an air-fuel ratio of an air-fuel mixture to be supplied to the engine to an enrichment degree at a timing at which a lean operation is changed to a stoichiometric operation in the engine, and recovering the enriched air-fuel ratio to the stoichiometric level at a recovery rate immediately after enriching the air-fuel ratio;

estimating the oxygen trapping ability of said second catalyst; and correcting the enrichment degree to decrease in correlation to a decrease in the estimated oxygen trapping ability.

* * * * *